United States Patent [19]

Reimann

[11] Patent Number: 4,485,638

[45] Date of Patent: Dec. 4, 1984

[54] HEAT EXCHANGER BYPASS SYSTEM FOR AN ABSORPTION REFRIGERATION SYSTEM

[75] Inventor: Robert C. Reimann, Lafayette, N.Y.

[73] Assignee: The United States of America as represented by the United States Department of Energy, Washington, D.C.

[21] Appl. No.: 468,222

[22] Filed: Feb. 22, 1983

[51] Int. Cl.³ ............................................. F25B 15/00
[52] U.S. Cl. ......................................... 62/476; 62/489
[58] Field of Search .................................. 62/476, 489

[56] References Cited

U.S. PATENT DOCUMENTS

| | | | |
|---|---|---|---|
| 3,014,349 | 12/1961 | Leonard, Jr. | |
| 3,206,947 | 9/1965 | Bourne et al. | 62/489 |
| 3,552,142 | 1/1971 | Schlichtig | 62/489 X |
| 4,314,668 | 2/1982 | Jansen et al. | 62/489 X |
| 4,364,240 | 12/1982 | Schulz et al. | 62/489 X |

*Primary Examiner*—Lloyd L. King
*Attorney, Agent, or Firm*—David L. Adour

[57] ABSTRACT

A heat exchanger bypass sytem for an absorption refrigeration system is disclosed. The bypass system operates to pass strong solution from the generator around the heat exchanger to the absorber of the absorption refrigeration system when strong solution builds up in the generator above a selected level indicative of solidification of strong solution in the heat exchanger or other such blockage. The bypass system includes a bypass line with a gooseneck located in the generator for controlling flow of strong solution into the bypass line and for preventing refrigerant vapor in the generator from entering the bypass line during normal operation of the refrigeration system. Also, the bypass line includes a trap section filled with liquid for providing a barrier to maintain the normal pressure difference between the generator and the absorber even when the gooseneck of the bypass line is exposed to refrigerant vapor in the generator. Strong solution, which may accumulate in the trap section of the bypass line, is diluted, to prevent solidification, by supplying weak solution to the trap section from a purge system for the absorption refrigeration system.

4 Claims, 1 Drawing Figure

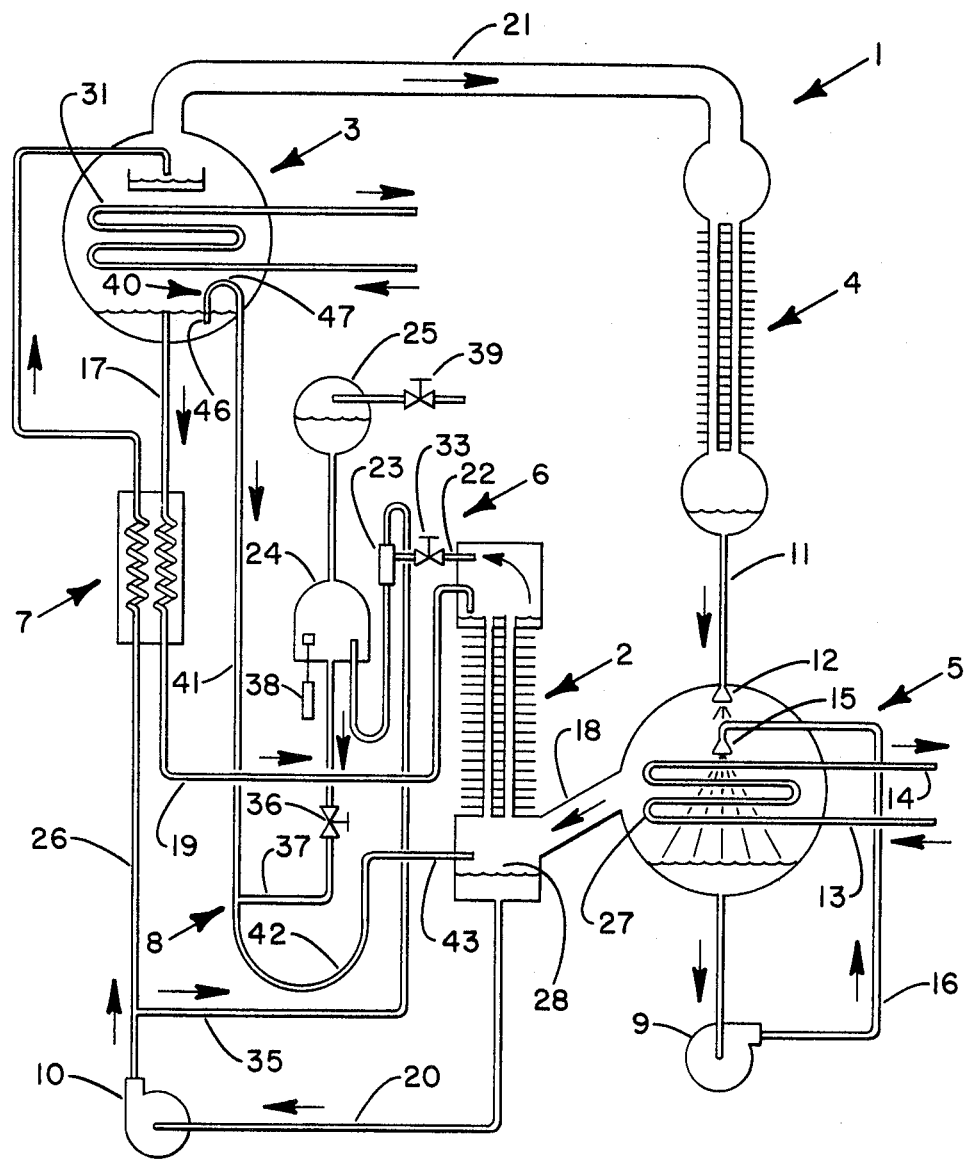

4,485,638

HEAT EXCHANGER BYPASS SYSTEM FOR AN ABSORPTION REFRIGERATION SYSTEM

STATEMENT AS TO RIGHTS TO INVENTIONS MADE UNDER FEDERALLY-SPONSORED RESEARCH AND DEVELOPMENT

The U.S. Government has rights in this invention pursuant to contract No. DE-AC03-77CS31587 awarded by the U.S. Department of Energy.

BACKGROUND OF THE INVENTION

The present invention relates to absorption refrigeration systems and, more particularly, relates to heat exchanger bypass systems for absorption refrigeration systems.

In an absorption refrigeration machine, relatively cool, weak absorbent solution is usually pumped from an absorber to a generator where heat is provided to boil off refrigerant from the weak absorbent solution to form relatively strong absorbent solution. The relatively hot, strong absorbent solution formed in the generator is returned to the absorber where it is cooled and brought into contact with refrigerant vapor to form the relatively weak absorbent solution which is pumped back to the generator to begin the cycle again. Conventionally, in order to improve the efficiency of an absorption refrigeration machine, a heat exchanger is provided for transferring heat between the relatively hot, strong solution flowing from the generator to the absorber and the relatively cool, weak solution pumped from the absorber to the generator. The heat exchanger serves to preheat the solution which is to be heated in the generator and serves to precool the solution which is to be cooled in the absorber.

Occasionally, difficulty is experienced in absorption refrigeration machines of the type described above due to cooling of the strong absorbent solution in the heat exchanger below the solidification point of the solution. This may occur, for example, if too much heat is supplied to the generator or if cooling water supplied to the absorber is unexpectedly cold. When solidification of strong absorbent solution occurs in the heat exchanger, the heat exchanger is blocked and strong solution is prevented from flowing to the absorber from the generator. This may result in weak solution being overcooled in the absorber which, in turn, results in further solidification of strong solution in the heat exchanger as overcooled, weak solution is passed through it to the generator. Eventually, the level of solution in the absorber may be lowered to a level such that the solution pump, which forwards weak solution to the generator from the absorber, may run dry thereby damaging the pump. In addition, the strong solution in the generator may rise to a level at which the solution enters the condenser and flows into the evaporator thereby impairing operation of the refrigeration machine for a period of time even after the solution heat exchanger is desolidified.

In order to prevent solidification of strong solution in the heat exchanger from rendering the refrigeration machine totally inoperative, a heat exchanger bypass system may be provided for passing excess solution from the generator around the solution heat exchanger to the absorber. This permits the refrigeration system to operate, at least at partial capacity and efficiency, when the solution heat exchanger is blocked. Also, use of such a bypass system prevents excess solution in the generator from entering the condenser and prevents running the solution pump dry. At the same time, the bypass system inhibits further solidification in the solution heat exchanger and tends to aid in desolidification because the weak absorbent solution from the absorber, which passes through the unblocked side of the heat exchanger, is warmed by the generator and then is returned directly to the absorber by the bypass system. This warms the weak absorbent solution in the absorber which, in turn, warms the blockage in the heat exchanger when the now warm weak absorbent solution flows back through the heat exchanger to the generator.

However, since the generator normally operates at a higher pressure than the absorber, a heat exchanger bypass system is normally provided with some means to prevent direct communication between these components during periods of normal operation of the refrigeration system. For example, a trap filled with liquid may be provided in the bypass system for maintaining the pressure difference between the generator and the absorber by providing a liquid vapor barrier in the trap which prevents refrigerant vapor in the generator from flowing to the absorber. Unfortunately, because refrigerant vapor from the generator is in direct contact with the liquid in the trap, some refrigerant vapor is continually absorbed by the liquid in the trap resulting in an efficiency loss for the refrigeration system. Also, past experience has demonstrated that, while a bypass system with a liquid trap is adequate to serve its intended function, once it has operated, strong solution which remains in the trap tends to be cooled during periods of nonuse of the bypass system, and solidification may take place in the trap. The operator of the normally functioning absorption refrigeration machine is unaware that solidification has taken place in the trap but when solidification again occurs in the solution heat exchanger, he finds that the bypass system is unable to serve its intended function because the trap is blocked with solidified absorbent solution. As shown in U.S. Pat. No. 3,206,947 to Bourne, et al., solidification of strong solution in the trap may be prevented by continuously supplying a metered quantity of relatively weak solution to the bypass system at a suitable point to dilute strong solution which may be in the trap of the bypass system. However, as shown in the Bourne, et al. patent, a special liquid line having a metering device is required to supply the weak solution to the bypass system.

SUMMARY OF THE INVENTION

Therefore, an object of the present invention is to improve the efficiency of absorption refrigeration systems.

Another object of the present invention is to improve the operation of and reduce the complexity of heat exchanger bypass systems for absorption refrigeration systems.

These and other objects of the present invention are obtained by an absorption refrigeration system having a heat exchanger bypass system including a bypass line having a gooseneck located in the generator of the refrigeration system. The gooseneck is positioned in the generator to control fluid flow from the generator into the bypass system so that strong absorbent solution flows from the generator through the bypass line to the absorber only when there is an undesirable build up of strong solution in the generator, and so that refrigerant vapor in the generator is prevented from entering the bypass line during normal operation of the refrigeration system. The bypass line also includes a trap section for providing a liquid-vapor barrier between the generator and the absorber. Solidification of strong absorbent solution in the trap is prevented without using special components by connecting a purge return line from a purge system for the absorption refrigeration system to the bypass line on the generator side of the trap to provide a flow of weak absorbent solution to the trap which dilutes any strong solution which may accumulate in the trap.

BRIEF DESCRIPTION OF THE DRAWINGS

Other features and advantages of the present invention will be apparent from the following detailed description in conjunction with the accompanying drawing in which:

The FIGURE is a schematic diagram of an absorption refrigeration system having a heat exchanger bypass system according to the present invention.

DESCRIPTION OF THE PREFERRED EMBODIMENT

Referring to the FIGURE, there is illustrated an air-cooled absorption refrigeration system 1 of a type which employs water as a refrigerant and lithium bromide as an absorbent solution. Technically, pure lithium bromide is an absorbent and is not an absorbent solution. However, it is customary to refer to the absorbent in an absorption refrigeration system as being a solution because the absorbent may have refrigerant dissolved therein. Therefore, the term "solution" is used throughout this patent application to denote both pure absorbent and absorbent solution. Also, it should be noted that the term "strong solution" is used herein to denote an absorbent solution which has a high concentration of absorbent, such as pure lithium bromide, while the term "weak solution" is used herein to denote an absorbent solution which has a low concentration of absorbent because it has a substantial quantity of refrigerant dissolved therein. Further, it should be noted that refrigerants, other than water, and absorbents, other than lithium bromide, may be employed within the scope of this invention, and that various modifications may be made to the refrigeration system 1 to accommodate these different refrigerants and absorbents.

The air-cooled absorption refrigeration system 1 illustrated in the FIGURE, includes an absorber 2, a generator 3, a condenser 4, an evaporator 5, a purge system 6, a solution heat exchanger 7, and a heat exchanger bypass system 8. Also, there is a refrigerant pump 9 and a solution pump 10.

Liquid refrigerant condensed in the condenser 4 passes through a refrigerant liquid passage 11 to a refrigerant spray nozzle 12, or plurality of such nozzles, in the evaporator 5. Also, liquid refrigerant which collects in a sump of the evaporator 5 is pumped by the refrigerant pump 9 through a passageway 16 to a second refrigerant spray nozzle 15, or plurality of such nozzles, in the evaporator 5. In this manner, a continuous flow of liquid refrigerant is in contact with heat exchange tubing 27 in the evaporator 5.

A fluid medium, such as water, passes into the heat exchange tubing 27 in the evaporator 5 through an inlet line 13 and is chilled by giving up heat to evaporate refrigerant within the evaporator 5. The chilled medium passes out of the heat exchange tubing 27 through an outlet line 14 to suitable remote heat exchangers (not shown) and is returned to the evaporator 5 through the inlet line 13 for rechilling. The refrigerant vapor from the evaporator 5 passes through refrigerant vapor passage 18 to the sump 28 of the absorber 2.

A strong solution inlet passage 19 admits strong solution from the generator 3 into the top of the absorber 2. The strong solution flows down through tubes in the absorber 2 and is brought into contact with refrigerant vapor from the evaporator 5 which is flowing up the tubes thereby forming weak solution which collects in the sump 28 of the absorber 2. A weak solution discharge passage 20 provides an inlet to the solution pump 10 which pumps weak solution from the absorber 2 through the solution heat exchanger 7 back to the generator 3.

A cooling medium, such as ambient air, is passed over the absorber 2 by operation of a fan unit (not shown), or other suitable means are used to cool the solution in the absorber 2, to promote the absorption of refrigerant vapor therein. If desired, the same cooling air used to cool the absorber 2 may also pass over the condenser 4 to condense refrigerant therein. Alternatively, a separate condenser fan unit, or other suitable means, may be used to cool the condenser 4.

Generator 3 includes a suitable source of heat for boiling refrigerant out of the weak solution supplied to the generator 3 from the absorber 2. For example, as shown in the FIGURE, the heat source may be a hot fluid, such as hot water, supplied through tubing 31 in the generator 3. The refrigerant vapor formed in the generator 3 passes through a discharge passageway 21 into the condenser 4 where it is cooled and condensed. The relatively hot, strong solution collected in the generator 3 passes through a line 17 to the solution heat exchanger 7 wherein the strong solution is precooled by relatively cool weak solution flowing through the heat exchanger 7 from the absorber 2 via line 26 to the generator 3. The precooled, strong solution from the heat exchanger 7 flows through the inlet passage 19 to the absorber 2 to begin the absorption cycle again.

As shown in the FIGURE, the purge system 6 includes a purge line 22 for collecting noncondensibles from the top of the absorber 2. There is a purge pickup valve 33 in the purge line 22 which is normally open during operation of the absorption refrigeration system 1. A fluid jet pump 23 pumps noncondensibles from the top of the absorber 2 through the purge line 22 into a separation chamber 24 where the noncondensibles are separated by buoyancy and collected in a purge reservoir 25. Weak solution is supplied through purge supply line 35 to the fluid jet pump 23 to operate the pump 23. The separation chamber 24 contains absorbent solution which absorbs refrigerant vapor which may be drawn into the purge system 6 with the noncondensibles from the top of the absorber 2. A continuous flow of absorbent solution through the purge system 6 is maintained by circulating absorbent solution from the purge chamber 24 through purge return line 37 to the heat exchanger bypass system 8.

In addition to the purge pickup valve 33, a purge return valve 36 is normally open during operation of the absorption refrigeration system 1. However, when noncondensibles build up in the purge reservoir 25 and in the separation chamber 24 this affects the level of absorbent solution in the separation chamber 24 to activate a purge level switch 38 in the separation chamber 24. When activated, the purge level switch 38 operates to energize an operator warning device such as a light or bell (not shown) indicating the need to exhaust the purge reservoir 25. The operator then closes the purge pickup valve 33 and the purge return valve 36 and opens a purge exhaust valve 39 to exhaust the noncondensibles from the system 1. After the noncondensibles are removed, the operator closes the purge exhaust valve 39, and opens the purge pickup valve 33 and the purge return valve 36, to return the purge system 6 to its normal operating state.

As shown in the FIGURE, the heat exchanger bypass system 8 is a bypass line including a gooseneck section 40, an inlet line section 41, a trap section 42, and an outlet line section 43, for passing excess strong solution from the generator 3 around the solution heat exchanger 7 to the absorber 2 when strong solution builds up in the generator 3 to an undesirable level due to solidification of strong solution in the heat exchanger 7 or other such blockage. The purge return line 37 from the purge system 6 for the absorption refrigeration system 1 is connected to the inlet line 41 of the bypass line to provide a flow of weak solution to the trap 42 of the bypass line. This flow dilutes strong solution which may accumulate in the trap 42 thereby preventing solidification of strong solution in the trap 42.

The open end 46 of the gooseneck 40 of the bypass line is positioned in the generator 3 so that it is submerged in the strong solution which accumulates in the generator 3 during normal operation of the refrigeration system 1. The top part 47 of the gooseneck 40 is positioned so that solution flows into the inlet line 41 of the bypass line only when solution in the generator 3 has built up to a selected level. This selected level is determined by the height and cross-sectional area of the gooseneck 40 and by the position of the gooseneck 40 in the generator 3.

The trap 42 of the bypass line normally has a quantity of liquid contained therein to provide a liquid-vapor barrier which maintains the normal pressure difference existing between the generator 3 and the absorber 2. The trap 42 is necessary so that even if the open end 46 of the gooseneck 40 is exposed to refrigerant vapor in the generator 3, the normal pressure difference between the generator 3 and the absorber 2 will be maintained. The vertical extent of the trap portion 42 below the absorber 2 is determined, in part, by the amount of liquid required to maintain the normal pressure difference between the generator 3 and the absorber 2. As shown in the FIGURE, the trap 42 is below the level of the absorber 2 and terminates in the upwardly extending outlet line 43 which connects the bypass line to the absorber 2.

If desired, suitable signal means (not shown) may be provided to indicate to an operator when solution is flowing through the bypass line so that the operator may take action to remedy this situation by removing the blockage in the heat exchanger 7 or by taking other appropriate action. Alternatively, an automatic control system may be actuated to unblock the heat exchanger 7 or to take other suitable steps. However, under typical operating conditions, when the bypass system 8 is operating, any blockage due to solidified strong solution in the heat exchanger 7 will probably be removed due to relatively warm, weak solution flowing from the absorber 2 through the heat exchanger 7 back to the generator 3.

The heat exchanger bypass system 8 operates as follows: during normal operation of the absorption refrigeration system 1, strong solution flows from the generator 3 through the line 17 to the solution heat exchanger 7 and then from the solution heat exchanger 7 through the strong solution inlet passage 19 into the absorber 2. Strong solution builds up in the generator 3 to the top of the line 17 in the generator 3 and above the open end 46 of the gooseneck 40 but below the top part 47 of the gooseneck 40. Refrigerant vapor in the generator 3 is prevented from entering the bypass system 8 because the open end 46 of the gooseneck 40 is submerged in the strong solution in the generator 3. This prevents undesirable losses of refrigerant vapor from the generator 3 to the bypass system 8. Preventing this undesirable refrigerant vapor loss improves the operating efficiency of the absorption refrigeration system 1. Also, the normal pressure difference between the generator 3 and the absorber 2 is maintained during normal operation of the refrigeration system 1 because the open end 46 of the gooseneck 40 is submerged in the strong solution in the generator 3 and because liquid in the trap 42 of the bypass line prevents refrigerant vapor in the generator 3 from flowing through the bypass system 8 to the absorber 2 even if the level of solution in the generator 3 falls below the open end 46 of the gooseneck 40.

If, due to some condition such as previously described, the strong solution in the heat exchanger 7 is cooled below its solidification point, the normal passage, through the line 17 and the passage 19, for return of strong solution from the generator 3 to the absorber 2 will be blocked off and the level of strong solution in the generator 3 will overflow the top part 47 of the gooseneck 40. This causes strong solution to flow from the generator 3 through the bypass line around the heat exchanger 7 to the sump 28 of the absorber 2. In this manner, the absorption refrigeration system 1 will be maintained in a mode of operation which prevents damage to the system 1 even if the heat exchanger 7 is completely blocked. Also, the flow of relatively hot, strong solution through the bypass system 8 to the sump 28 of the absorber 2 will warm the weak solution which is being pumped by solution pump 10 back to the generator 3 through the heat exchanger 7. The relatively warm, weak solution flowing through the heat exchanger 7 may sufficiently warm any solidified strong solution in the heat exchanger 7 to desolidify this strong solution thereby returning the refrigeration system 1 to normal operation or, as discussed above, an alerted operator may take appropriate action to return the refrigeration system 1 to normal operation.

Also, it should be noted that during normal operation of the refrigeration system 1, weak solution is passed from the purge system 6 through the purge return line 37 into the inlet line 41 of the bypass system 8. This weak solution serves to dilute strong solution which may accumulate in the trap 42 after operation of the bypass system 8. Connecting the purge return line 37 to the inlet line 41, rather than to other points in the bypass system 8, such as to the outlet line 43, ensures that weak solution will be properly intermixed with liquid in the trap 42 because weak solution supplied to the bypass system 8 naturally tends to flow back to the absorber 2. Also, it should be noted that since weak solution from the purge system 6 must be returned to the refrigeration system 1 at some point anyway, there is no need to provide any additional components for routing weak solution to the trap 42 of the bypass system 8.

In conclusion, it should be noted that although the present invention has been described in conjunction with a particular embodiment, various modifications and other embodiments will be apparent to one of ordinary skill in the art to which this invention pertains. Therefore, it is to be understood that these various modifications and other embodiments of the present invention may be made without departing from the scope of the invention as described herein and as claimed in the appended claims.

I claim:

1. In an absorption refrigeration system having a generator wherein weak solution is heated to form refrigerant vapor which flows to a condenser, and to form relatively hot, strong solution which flows from the generator through a heat exchanger to an absorber wherein the strong solution is cooled and brought into contact with refrigerant to form relatively cool, weak solution which is pumped back through the heat exchanger, in heat exchange relationship with the hot, strong solution flowing therethrough, to the generator, a heat exchanger bypass system comprising:

a bypass line including a gooseneck located in the generator, said gooseneck having an open end positioned in the generator below the level to which strong solution builds up in the generator during normal operation of the refrigeration system and said gooseneck sized, and positioned in the generator, to allow strong solution in the generator to flow over a top part of the gooseneck into the bypass line only when strong solution builds up in the generator above a selected level.

2. A heat exchanger bypass system for an absorption refrigeration system as recited in claim 1 wherein the bypass line further comprises:

a trap section which normally has a quantity of liquid contained therein for providing a liquid-vapor barrier between the generator and the absorber; and means for supplying weak solution from a purge system for the absorption refrigeration system to the trap section in dilute strong solution which may accumulate in the trap section.

3. An absorption refrigeration system comprising:

a generator means for generating refrigerant vapor and strong solution by heating weak solution;

a condenser means for receiving the refrigerant vapor from the generator and for condensing the refrigerant vapor to a liquid;

an evaporator means for receiving the liquid refrigerant from the condenser means and for evaporating the liquid refrigerant to cool a medium which is in heat exchange relationship with the refrigerant in the evaporator;

an absorber means for receiving the refrigerant vapor from the evaporator means, for receiving the strong solution from the generator means, and for bringing the refrigerant vapor and the strong absorbent solution into contact so that the refrigerant vapor is absorbed by the strong solution to produce weak solution;

a solution pump means for supplying the weak solution produced by the absorber means to the generator means;

a heat exchanger means located between the absorber means and the generator means for transferring heat between the weak solution, which is pumped from the absorber means by the solution pump means to the generator means, and the strong solution flowing to the absorber means from the generator means; and a bypass line including a gooseneck located in the generator means, said gooseneck having an open end positioned in the generator means below the level to which strong solution builds up in the generator means during normal operation of the absorption refrigeration system, and said gooseneck sized, and positioned in the generator means to allow strong solution in the generator means to flow over a top part of the gooseneck into the bypass line only when strong solution builds up in the generator means above a selected level.

4. An absorption refrigeration system as recited in claim 3 wherein the bypass line further comprises:

a trap section which normally has a quantity of liquid contained therein for providing a liquid-vapor barrier between the generator and the absorber; and means for supplying weak solution from a purge system for the absorption refrigeration system to the trap section to dilute strong solution which may accumulate in the trap section.

* * * * *